(12) United States Patent
Joeressen et al.

(10) Patent No.: US 6,487,400 B2
(45) Date of Patent: *Nov. 26, 2002

(54) COMMUNICATIONS DEVICE AND A METHOD FOR CONTROL OF ITS OPERATION

(75) Inventors: Olaf Johannes Joeressen, Dusseldorf (DE); Markus Schetelig, Essen (DE)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,030

(22) Filed: Mar. 12, 1999

(65) Prior Publication Data

US 2002/0123374 A1 Sep. 5, 2002

(30) Foreign Application Priority Data

Mar. 18, 1998 (DE) .......................................... 198 11 853

(51) Int. Cl.$^7$ ................................................. H04B 1/38
(52) U.S. Cl. ....................................... 455/343; 455/574
(58) Field of Search ................................ 455/343, 572, 455/574, 556, 558, 127; 370/311

(56) References Cited

U.S. PATENT DOCUMENTS

| | | | |
|---|---|---|---|
| 4,804,954 A | * 2/1989 | Macnak et al. ........ 340/825.44 |
| 5,148,473 A | * 9/1992 | Freeland et al. ............ 455/556 |
| 5,289,059 A | 2/1994 | Pikkarainen ................ 307/520 |
| 5,365,119 A | 11/1994 | Kivari ........................ 327/115 |
| 5,387,874 A | 2/1995 | Rapeli ........................ 327/337 |
| 5,390,223 A | 2/1995 | Lindholm ..................... 377/49 |
| 5,416,435 A | 5/1995 | Jokinen et al. ............. 327/113 |
| 5,497,116 A | 3/1996 | Rapeli ........................ 327/337 |
| 5,541,976 A | * 7/1996 | Ghisler ....................... 455/426 |
| 5,581,776 A | 12/1996 | Hagqvist et al. ............ 395/590 |
| 5,802,351 A | 9/1998 | Frampton .................... 395/500 |
| 5,831,303 A | 11/1998 | Rapeli ........................ 257/316 |
| 5,838,672 A | 11/1998 | Ranta ......................... 370/335 |
| 5,872,700 A | 2/1999 | Collander ................... 361/760 |
| 5,995,820 A | * 11/1999 | Young et al. ............... 455/343 |
| 6,226,189 B1 | * 5/2001 | Haffenden et al. .......... 361/814 |
| 6,253,060 B1 | * 6/2001 | Komara et al. ................ 455/9 |

* cited by examiner

Primary Examiner—Edward F. Urban
Assistant Examiner—Erika A. Gary
(74) Attorney, Agent, or Firm—Perman & Green, LLP

(57) ABSTRACT

The invention relates to a method for controlling a communications device which has a main operating unit (10) and a subunit (11). In order to ensure that as little energy as possible is consumed, the invention provides that, after an operating period, operating state data for the main unit (10) are stored in a status memory (18) in the subunit (11) and, after this, the voltage supply for the main operating unit (10) is switched off in order to change the communications device to an energy saving mode, and in that, after the voltage supply for the main operating unit (10) has been switched on, the stored operating state data are transmitted from the status memory (18) to the main operating unit (10) in order to operate the communications device during the following operating period.

24 Claims, 2 Drawing Sheets

COMMUNICATIONS DEVICE AND A METHOD FOR CONTROL OF ITS OPERATION

Figure 1:
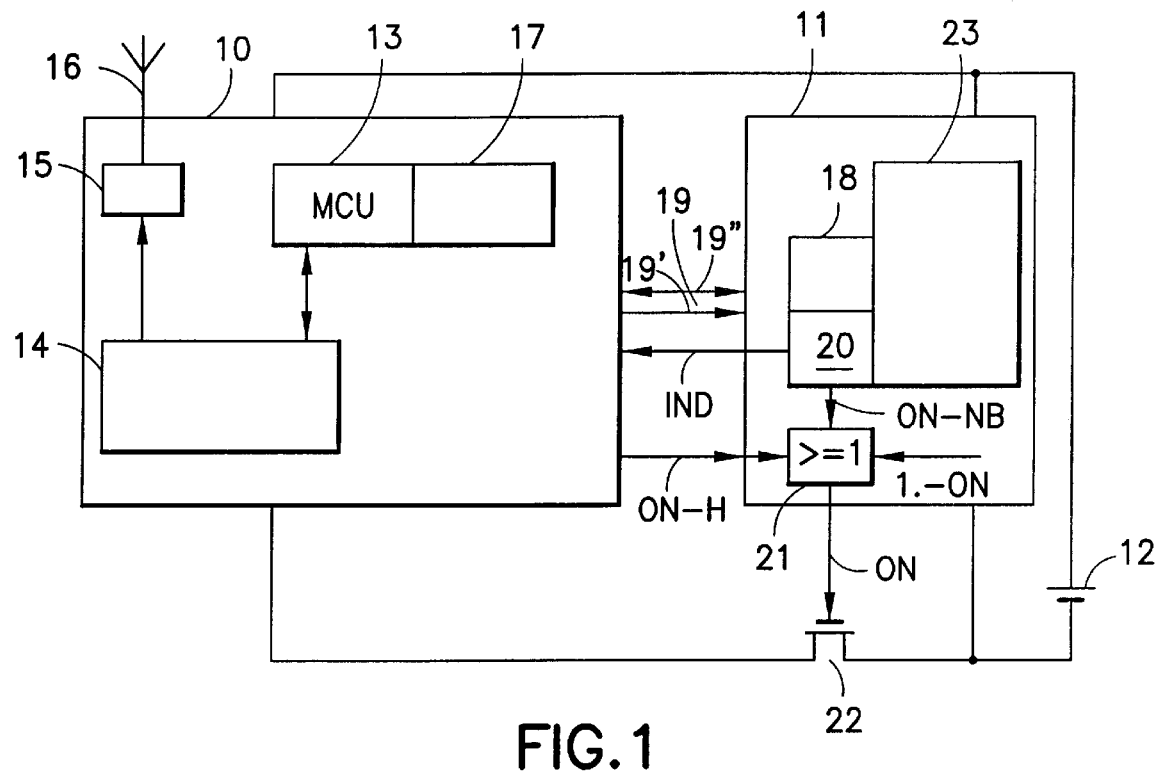

The invention relates to a method for controlling a communications device which has a main operating unit and a subunit, as well as to a communications device, in particular a submodule of a mobile telecommunications unit, which interchanges data with a main module during time slots which recur at regular intervals.

In the case of a communications device, particularly in the case of a mobile telecommunications unit, whose voltage is supplied with the aid of a battery or a rechargeable battery, it is necessary to keep the power consumption as low as possible in order to ensure that the battery or rechargeable battery operating life is as long as possible and thus that the communications device is ready to operate for as long as possible. To this end, during no-load times, that is to say during times in which no operating functions are required, the communications device is normally changed to standby mode or energy saving mode in which the only circuit devices which are powered are those which are required to set up the full operating capability of the communications device when required.

Fast clock generators are thus normally switched off, while the individual function blocks are still supplied with a controlled voltage in order to keep stored the operating state data which are contained in the individual memories in the function blocks.

In consequence, although the power consumption of the communications device can be reduced considerably in the standby mode, this power saving is, however, not sufficient for communications devices which need to have extremely low power consumption because they can use only very small batteries or rechargeable batteries.

Proceeding from this, the invention is based on the object of providing a method for controlling a communications device, which method permits extremely low power consumption and thus a very long operating life for the voltage source. Furthermore, the object of the invention is to provide a communications device which can be controlled using this method.

According to the invention, this object is achieved by a method for controlling a communications device having a main operating unit and a subunit, in which, after one operating period, operating state data for the main operating unit are stored in a status memory in the subunit and the voltage supply for the main operating unit is switched off in order to change the communications device to an energy saving mode, and in which, after the voltage supply for the main operating unit is switched on, the stored operating state data are transmitted from the status memory to the main operating unit in order to operate the communications device during the following operating period.

The invention thus provides for the operating state data which are required for correct operation of the communications device to be stored in a status memory which is provided for this purpose and is assigned to a subunit, so that the voltage supply for the main operating unit can be switched off completely since only the subunit with the status memory now need be supplied with voltage. After the voltage supply has been switched on for the next operating period, the stored operating-state data are then simply transmitted back to the main operating unit, so that it is fully operational again at the start of the next operating period.

An expedient development of the invention is distinguished by the fact that the voltage supply for the main operating unit is switched on by means of a switch-on signal from the subunit after a respectively predetermined waiting time has elapsed. Both the storage of the operating state data and the monitoring of the switch-on time are thus carried out in the subunit, which can be designed specifically for low power consumption without adversely affecting the operational reliability of the communications device.

It is particularly advantageous for a time indicator to be produced at a time after the voltage supply for the main operating unit has been switched on, in order to define the start time of the following operating period. The time indicator which is provided according to the invention and is produced after the main operating unit has been switched on is intended to occur at a fixed time interval before the start of the following operating period. By detecting the actual time interval between the time indicator and the start of the next operating period, which start can be defined, for example, in a subordinate communications device by means of an external event, such as a received burst, the actual start time for the following operating period can be compared with the assumed start time in order, by lengthening or shortening the energy saving mode, to set the actual interval between the time indicator and the start of the following operating period to the specified interval. However, if the start of an operating period is not dependent on an external event, then the following operating period (in which, for example, transmission operation is carried out) starts after a predetermined time, which is calculated from the time indicator, has elapsed. The time indicator provided according to the invention is thus an absolute time indicator which can be used not only to define the start of operating periods but also to define the duration of the energy saving mode.

In this case, the invention provides in particular that the time interval between the time indicator for the start time and the following operating period is measured by the main operating unit in order to optimize the duration of the effective time for which the main operating unit is switched off in a communications device whose main operating unit operates periodically. Particularly in the case of a submodule in a mobile telecommunications unit, which submodule operates only during specific time slots whose time interval is defined by the communications protocol used or the standard used, this makes it possible for the main operating unit to stay in the energy saving mode for as long as possible between two successive operating periods, that is to say between two time slots.

In this case, it is expedient if the waiting time is predetermined for the subunit as a function of the time interval between the time indicator and the start time of the following operating period by the main operating unit. As a result of the waiting time which defines the switch-on time being determined in the main operating unit, while only the corresponding waiting time supplied from the main operating unit is required in the subunit in order to define the switch-on time, the subunit can be further simplified, as a result of which its power consumption can be reduced further.

In particular, it is possible according to the invention to redefine the waiting time for each operating period.

The switch-on time can be defined particularly easily if the end of the waiting time in the subunit is defined with the aid of a clocked counter, whose running count is compared with a first comparison value which corresponds to the waiting time, that is to say is compared with the waiting time which is transmitted from the main operating unit to the subunit.

A further refinement of the invention provides that the counter is restarted after the waiting time has elapsed, that the running count is compared with a second comparison value, in order to supply to the main operating unit the time indicator which is used to define the start time for the following operating period.

The time indicator, which is produced in this way and is required to define the start time for the following operating period, is in principle at a time interval from the switch-on time for the voltage supply which can be predetermined at any desired fixed value but is normally predetermined as a value fixed by the circuit design, and corresponds to the end of the waiting time. Adaptation of the waiting time thus allows the switch-on time for the voltage supply for the main operating unit to be at a predetermined time which, on the one hand, is sufficiently late that the time between the two operating periods is used in an optimum manner for the energy saving mode, but on the other hand is sufficiently early that the main operating unit has sufficient time to ensure stable operation of its fast clock generator and to recover the operating state data from the status memory for the following operating period.

The method according to the invention expediently provides for the counter to be started with the aid of software reset command which is supplied from the main operating unit. This makes it possible to reduce the number of signal lines between the main operating unit and the subunit in a circuit for carrying out the method according to the invention, since one data line can be used for the reset command.

In order to keep the duration of the process of switching the main operating unit on and off as short as possible so that the time period between two successive operating periods can be utilized even better, a particularly preferred refinement of the invention provides that a clock signal is transmitted from the main operating unit to the subunit in order to store the operating state data for the main operating unit in the status memory in the subunit and in order to read the operating state data from the status memory. Thus, according to the invention, the fast clock for the main operating unit is used for storing and reading the operating state data, so that neither the switching-off process nor the switching-on process is unnecessarily long drawn out.

The method according to the invention can expediently be used if the operating periods of the main operating unit are matched to time slots which recur at regular intervals, during which the main operating unit interchanges data with a higher-level communications device, that is to say, for example, if the main operating unit of a submodule of a mobile telecommunications unit communicates with its main module via a radio interface.

Another development of the invention is distinguished by the fact that the respectively following operating period is started by an external event, which occurs at regular intervals at least during a time period which comprises a plurality of operating periods, in particular by a burst which can be received by the main operating unit, that is to say by a signal bundle that is used in the time-division multiplex, multiple-access method.

The method according to the invention can also be used, however, particularly advantageously in the case of higher-level communications devices which start the operating period without being dependent on external events. In this case, the invention provides for operating periods to be started in each case as soon as their start time has been defined with the aid of the time indicator.

A particularly preferred refinement of the invention is distinguished by the fact that the main operating unit produces a switch-on hold signal in order to maintain its voltage supply after switching on during the operating period and to switch itself off after the end of the operating period.

A communications device according to the invention, in particular a submodule of a mobile telecommunications unit, which submodule interchanges data with a main module during time slots which recur at regular intervals, has a main operating unit for carrying out assigned functions, and a subunit which has a status memory for operating state data for the main operating unit, and a timing circuit which controls the voltage supply for the main operating unit.

In this case, it is particularly advantageous if the timing circuit has a clocked counter whose counter output is connected to one input of a comparison circuit, which compares the count from the counter with a comparison value which is defined by the main operating unit, in order to produce a switch-on signal for the voltage supply for the main operating unit, one output of the comparison circuit being applied to a hold circuit which emits the switch-on signal for a time period.

In this case, it is expedient if the timing circuit has a second comparison circuit, which compares the count with a second comparison value, in order to supply to the main operating unit an output signal which provides a time indicator for defining the start time of the following operating period for the main operating unit.

An expedient refinement of the invention provides that the output signal of the second comparison circuit is supplied to the main operating unit via a gate circuit as an indicator signal, which gate circuit is controlled by an enable signal, which indicates the type of switch-on process. In this way, the indicator signal which is required to set the waiting time can be used in order to transmit further operating state information from the subunit to the main operating unit, without any additional data or signal line being required for this purpose. In particular, the further operating state information may comprise information about whether the main operating unit is being switched on from a completely switched-off state or from the energy saving mode.

In order to reduce the power consumption of the communications device further, the invention provides that the counter in the subunit is clocked by a clock generator which is integrated in a further electronic device with which the communications device is associated. The use of an external clock generator, which is provided in a further electronic device associated with the communications device, allows the number of loads which are activated in the subunit during the energy saving mode to be reduced further. In particular, the subunit does not require a voltage regulator, so that a considerable reduction in the power consumption is achieved by omitting this load, which is normally the largest load in the energy saving mode.

Furthermore, in this case, the subunit can be arranged separately from the main operating unit in another electronic device, so that the voltage source for the further communications device can be used for the voltage supply for the subunit. This further reduces the load on the battery or the rechargeable battery in the communications device.

For fast storage and reading of operating state data, it is expedient if a bus having a clock signal line and a data line is provided for data interchange between the main operating unit and the subunit, so that a fast memory and read clock, respectively, can be transmitted to the subunit in order to store and read the operating state data in and from, respectively, the status memory.

Figure 2:
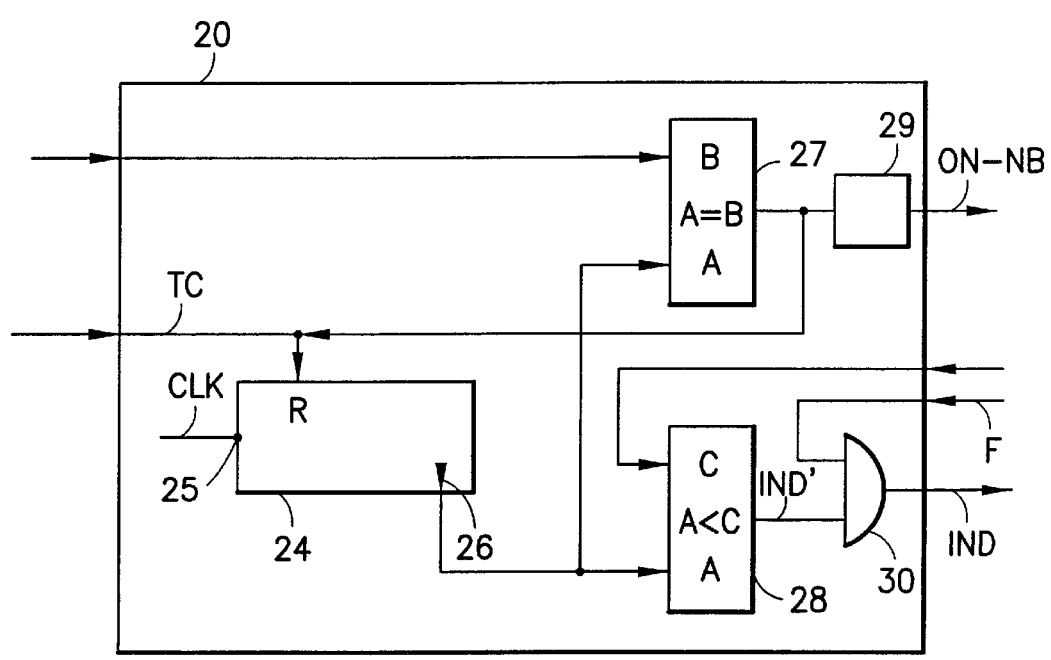
Figure 3:
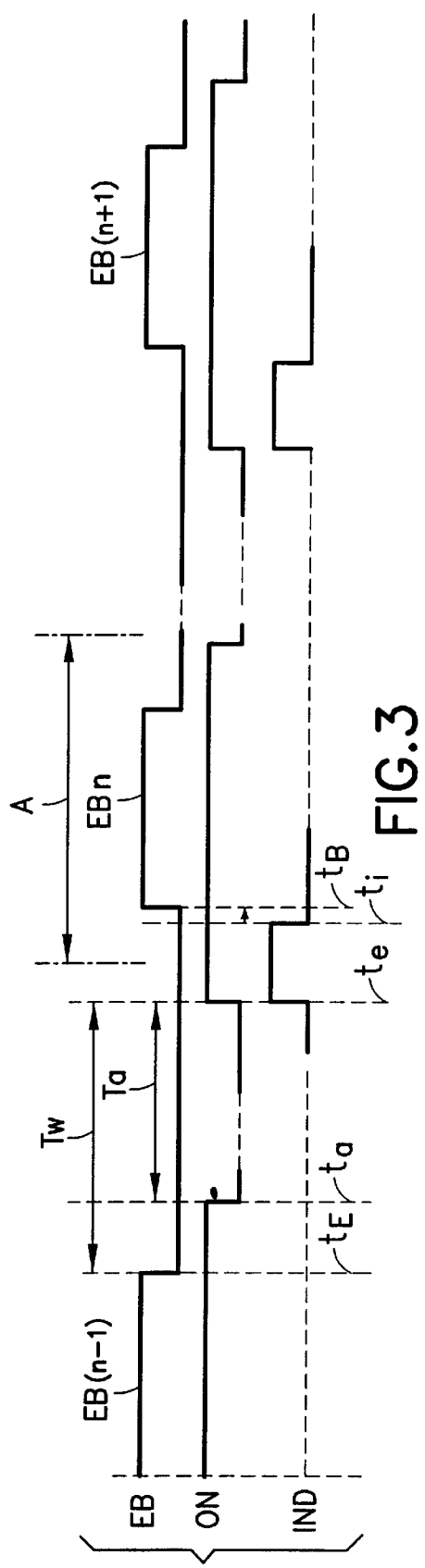
Figure 4:
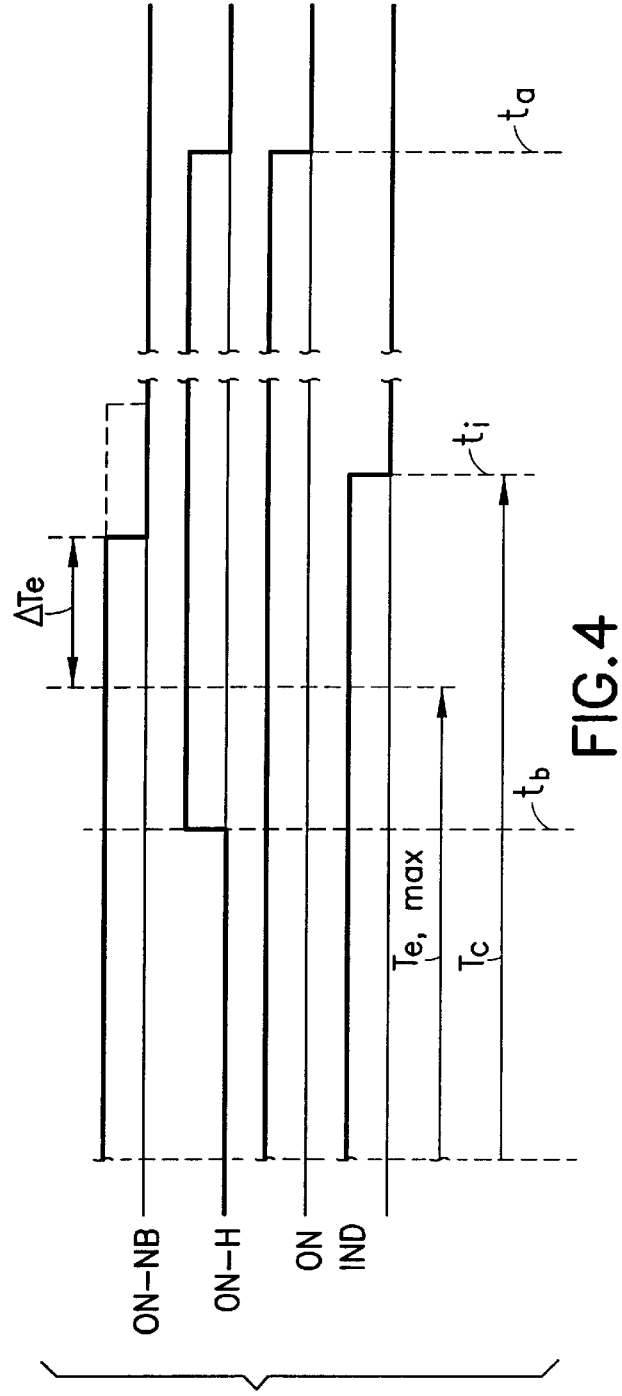

The invention will be explained in more detail in the following text using examples and with reference to the drawing, in which:

FIG. 1 shows a schematic block diagram of a communications device according to the invention, FIG. 2 shows a schematic block diagram of a timing circuit in the communications device according to FIG. 1, FIG. 3 shows a timing diagram to illustrate the times for switching off a main operating unit in a communications device relative to its operating periods, and FIG. 4 shows an illustration of the area A in FIG. 3, expanded in time.

Components and signals which correspond to one another are provided with the same reference symbols in the various figures of the drawing.

FIG. 1 shows a communications device, in particular a submodule of a mobile telecommunications unit, having a main operating unit 10 and a subunit 11, which are both supplied from a voltage source 12. The main operating unit 10 has as a control unit 13 a microcomputer unit MCU, which controls a function block 14 for carrying out data communication. The function block 14 is connected to a transmitting/receiving circuit 15, to which an antenna 16 is connected. An energy saving mode control circuit 17 is provided to control the processes involved in switching the main operating unit 10 off and on and is referred to in the following text, for short, as the mode control circuit 17.

The subunit 11 has a status memory 18 in which operating state data for the main operating unit 10 are stored when its voltage supply is completely switched off. A bus 19 having a clock signal line 19' and a data line 19" connects the main operating unit 10 to the subunit 11 in order to allow operating state data and control data to be interchanged between the main operating unit 10 and the subunit 11. A timing circuit 20 is provided in the subunit 11 in order to monitor the time at which the main operating unit 10 is switched on, and supplies a switch-on signal ON-NB to an OR gate 21 to switch the main operating unit 10 on again for the next operating period, the output signal from which gate 21 drives, as a switch-on signal ON, a switch 22 in the voltage supply for the main operating unit 10. The OR gate 21 is also supplied with a switch-on hold signal ON-H from the main operating unit 10. Finally, a switch-on signal 1.-ON can be supplied to a third input of the OR gate 21, in order to switch the communications device on for the first time.

Furthermore, the subunit 11 has a control circuit 23 which, when necessary, controls the transfer of information and data from the main operating unit 10 and the process of passing such information and data on to the timing circuit 20.

As is shown in FIG. 2, the timing circuit 20 comprises a counter 24 which counts clock signals CLK applied to an input 25 and which supplies, via an output 26, the respective current count A to a first and a second comparison circuit, 27 and 28 respectively. The first comparison circuit 27 is supplied by the mode control circuit 17 in the main operating unit 10, via the bus 19 and the control circuit 23, with a switch-on time B which corresponds to the waiting time $T_w$ (see FIG. 3) between the resetting of the counter 24 and the switch-on time $t_e$, and with which the respectively current count A of the counter 24 is compared. As shown in FIG. 3, the resetting of the counter 24 may coincide with the end $t_E$ of the last operating period EB (n−1). However, for the energy saving mode to be as long as possible, it is advantageous to restart the counter 24 as early as a time, which is predetermined in a fixed manner, before completion of the current operating period.

When the current count A of the counter 24 matches the switch-on time B, the first comparison circuit 27 emits an appropriate signal to a hold circuit 29, which supplies the switch-on signal ON-NB for a time $(T_{e,max}+\Delta T_e)$ to the OR gate 21. At the same time, the output signal of the first comparison circuit 27 is applied to the reset input R of the counter 24, in order to reset it. In addition to the reset signal from the first comparison circuit 27, the counter 24 is also supplied with a reset signal TC, which may preferably be a software command, from the mode control circuit 17 and via the bus 19 and the control circuit 23, in order to reset it in each case towards the end of an operating period EBn of the main operating unit 10, in order to monitor the switch-on time for the next operating period EB (n+1).

The second comparison circuit 28 receives an indicator time C via the control circuit 23 and produces a logic signal IND', which is supplied to the main operating unit 10 as a logic signal IND, via a gate circuit 30 which is, for example, an AND gate. The signal IND' remains at logic "1" for as long as the current count A is less than the indicator time C. As soon as the current count becomes greater than the indicator time C, the signal IND' assumes the logic value "0". The gate circuit 30 is enabled by an enable signal F as soon as the communications device has been switched on for the first time. Thus, once the communications device has been switched on for the first time, the signal IND' supplied from the second comparison circuit 28 is passed on as the indicator signal IND from the gate circuit 30 to the main operating unit 10.

The following text uses FIGS. 3 and 4 to explain how the method according to the invention is carried out with the communications device described with reference to FIGS. 1 and 2.

As the profile (illustrated in FIG. 3) of the switch-on signal ON relative to the individual operating periods EB shows, the supply voltage of the main operating unit 10 is switched off between individual operating periods EB, in order to keep the energy consumption as low as possible. The individual operating periods EB may be defined, for example, by individual received bursts, that is to say by signal bundles as are used in the time-division multiplex, multiple access method.

In order to switch the main operating unit 10 off, the mode control circuit 17 outputs a reset signal TC, towards the end of the respective operating period EB, via the data line 19" of the bus 19 and the control circuit 23 in the subunit 11 to the timing circuit 20, which signal resets the counter 24, which action corresponds to starting the counter 24. The output of the first comparison circuit 27 and the output of the hold circuit 29 still remain at the logic value "0", while the signal IND' from the second comparison circuit 28 assumes the logic value "1". Since the enable signal F is at the logic value "1" during normal operation of the communications device, the gate circuit 30 is enabled and emits the signal IND' from the second comparison circuit 28, without changing it, as the indicator signal IND to the main operating unit 10.

In the illustrated exemplary embodiment, once the voltage supply has been switched on, this being coincident with the resetting of the counter 24 in this case, the operating state data which are relevant for the next operating period of the main operating unit 10 are transmitted via the bus 19 to the subunit 11, in order to be stored in the status memory 18 there. In order to allow fast memory operation, a clock signal is sent via the clock signal line 19' of the bus 19 at the same time that the data are transmitted via the data line 19" of the bus 19, and this clock signal is used to clock the writing of the operating state data to the status memory 18.

The fast clock signal of the main operating unit 10, is produced by a fast clock generator at a frequency which is normally in the MHz range, and can be used as a clock signal for this purpose. Once all the operating state data have been saved in the status memory 18, the switch-on hold signal ON-H, which is used as a self-latching signal, is set to the logic value "0", so that the output signal ON from the OR gate 21 also assumes the value "0" at the time $t_a$. The switch 22, which switches the voltage supply of the main operating unit 10, is thus switched to its off state. The main operating unit 10 is thus completely switched off, and the voltage source 12 now has to supply only the subunit 11.

Thus, only the status memory 18, the timing circuit 20 and the control circuit 23 which supplies the indicator time C and the enable signal F now still need to be supplied with voltage, as well as a relatively slow clock generator, which is not illustrated in any more detail and operated, for example, in the kHz range. The relatively slow (that is to say operating at low frequency) clock signal generator, which operates, for example, at 32 kHz, allows relatively low power consumption since the invention is not dependent on the absolute accuracy of the frequency of the clock signal generator, so that it can also be operated with an unregulated voltage. The reduced power consumption in this case results, in particular, from dispensing with a voltage regulator since, owing to their quiescent currents, voltage regulators normally have a relatively high current consumption.

As soon as the clocked counter 24 supplies a count A which matches the corresponding waiting time B and thus defines the switch-on time $t_e$, the output signal from the first comparison circuit 27 assumes the value "1", so that the output signal ON-NB from the hold circuit 29 also assumes the value "1", which is maintained for a time period which will be described in more detail with reference to FIG. 4. The output signal ON-NB from the hold circuit 29 is applied via the OR gate 21 as a switch-on signal ON to the switch 22, so that the voltage supply for the main operating unit 10 is switched on. At the same time, the counter 24 is reset. The signal IND' from the second comparison circuit 28 thus assumes a logic value "1", since the count A of the counter 24, after it has been reset, is less than the indicator time C. The signal IND' is supplied via the gate circuit 30 as the indicator signal IND to the main operating unit 10 since, in the described case in which the process of switching on again takes place from a waiting state or sleep mode, the enable signal F enables the gate circuit 30.

However, if the switching on process takes place from a completely switched-off state, the gate circuit 30 is inhibited by the enable signal F, whose logic value is then "0", so that the indicator signal IND also assumes the logic value "0".

Once the voltage supply has been switched on and the basic functions of the main operating unit 10 have been activated and, in particular, the fast clock generator is operating in a stable state, the mode control circuit 17 first of all defines whether the main operating unit 10 has been switched on from a completely switched-off state (IND=logic "0") or from the energy saving mode (IND=logic "1"). The indicator signal IND is interrogated for this purpose, which, as shown in FIG. 3, is at the value "1" after the switch-on time $t_e$. The operating state data are thus read from the status memory 18 via the bus 19, the fast clock produced by the fast clock generator in the main operating unit 10, at a frequency of, for example, 18 MHz, once again being used as the read clock. As soon as all the required operating state data have been read and other operating parameters which can be regenerated from said data have been produced for the following operating period EBn, the process of switching the main operating unit 10 on is completed. The switch-on hold signal ON-H which is supplied from the main operating unit 10 to the OR gate 21 in the subunit 11, now assumes the logic value "1", in order to keep the switch 22 switched on irrespective of the output signal from the timing circuit 20.

Thus, if, after completing the process of switching the main operating unit 10 on at the time $t_b$ (see FIG. 4), the switch-on hold signal ON-H assumes the value "1", the switch-on signal ON-NB can become "0" again for the next operating period. In order to ensure the voltage supply even in the event of fluctuations in the time period $T_e$ for the process of switching the main operating unit 10 on, the hold circuit 29 keeps the switch-on signal ON-NB for the next operating period EBn at the logic value "1" until a time $\Delta T_e$ has also passed after the maximum time period $T_{e,max}$ has elapsed for the process of switching the main operating unit 10 on. This ensures that the voltage supply to the main operating unit 10 remains switched on even in the situation in which the process of switching the main operating unit 10 on takes the maximum permissible time $T_{e,max}$ for this purpose, since the two signals ON-NB and ON-H which are applied to the OR gate 21 in order to form the switch-on signal ON are simultaneously applied to the OR gate 21, at least for the time period $\Delta T_e$.

In order to make the actual switched-off time $T_a$ between two successive operating periods EB (n−1) and EBn as long as possible, and in this way to save as much energy as possible, the mode control circuit 17 monitors the position of the switch-on time $t_e$ relative to the time $t_B$ of the actual start of the following operating period, which is identified, for example in the case of a telecommunications device, by the arrival of a burst. The indicator signal IND is used for this purpose, which changes from the value "1" to the value "0" at the time $t_i$ when the count A of the counter 24 matches the indicator time C. This transition, that is to say the falling flank of the indicator signal IND at the time $t_i$, is used as the time indicator which, via the indicator time C, is associated with the switch-on time $t_e$. The indicator time C thus corresponds to the time $(t_i-t_e)$ between the switching on of the main operating unit 10, that is to say the resetting of the counter 24, and reaching the indicator time C.

The time interval between the falling flank of the indicator signal IND at the time $t_i$ and the occurrence of the next burst, whose start identifies the start $t_B$ of the next operating period EBn, is detected, for example, by means of a counter (which is clocked by the fast clock generator in the main operating unit 10) in the mode control circuit 17, and is compared with a predetermined nominal value $(t_B-t_i)_{nom}$. The nominal value is in this case chosen to be positive, as is shown in FIG. 3 in conjunction with the operating period EBn.

If the respective currently detected time interval $(t_B-t_i)$ between the falling flank of the indictor signal IND and the start of the associated operating period indicates, in comparison with the redetermined nominal value $(t_B-t_i)_{nom}$, that this time indicator has been shifted in the "early" direction relative to the time at which the next operating period starts, then the waiting time $T_w$ from the end $(t_E)$ of an operating period EB (n−1) to the switch-on time $t_e$ for the next operating period EBn can be increased, by increasing the switch-on time B. Conversely, the switch-on time B is reduced if the time indicator shows that the desired switch-on time $t_e$ has been shifted in the "late" direction with respect to the time $t_B$ at which the next operating period EBn starts.

The monitoring of the time interval $(t_B-t_i)$ between the time indicator and the actual start $(t_B)$ of the next operating period makes it possible, in particular, to use a relatively simple counter 24, which can be clocked at any desired frequency, as long as it is constant. A relatively simple clock generator can be used for this purpose, which does not require a regulated voltage, so that it is possible to dispense with a voltage regulator. Discrepancies between the clock frequency and a nominal value can be compensated for by monitoring the time indicator which is produced with the aid of the indicator signal IND. Avoiding the need for a voltage regulator in the subunit 11 makes it possible to reduce its power consumption even more.

The time indicator can be used not just for lower-level communications devices in which the operating periods are started by external events but also for higher-level communications devices, in order to define the start of the respective following operating period. In this case, the time which passes after the occurrence of the time indicator is detected and is compared with the nominal value $(t_B-t_i)_{nom}$ for the time interval between the time indicator and the time $t_B$ at which the following operating period starts. As soon as the time reaches the nominal value, the following operating period EB is started. To allow deviations from the nominal value of the clock frequency for the counter 24 to be compensated for, the clock generator which clocks the counter 24 is compared with the fast clock generator in the main operating unit 10.

For this purpose, measurement and monitoring cycles are preferably carried out once the communications device has been brought into use, during which cycles the counter 24 in the subunit 11 is started towards the end of an operating period EB without, however, switching off the voltage supply for the main operating unit 10. As soon as the time indicator, that is to say the falling flank of the indicator signal IND, is detected at the time $t_i$ after the switch-on time $t_e$, the count of a fast counter in the main operating unit 10 is detected and is stored as the nominal value. Then, in normal operation, once the voltage supply for the main operating unit 10 has been switched on, its fast counter is set to this nominal value as soon as the time indicator is found.

The count which exists at the time $t_i$ of the time indicator can be compared in a monitoring cycle with the nominal value which should exist when the time indicator occurs in order, on the basis of this comparison, to change the waiting time B for the first comparison circuit 27 in the timing circuit 20 such that the time indicator is in each case produced at the predetermined absolute time.

Linking the indicator signal IND, whose falling flank, for example, supplies a time indicator, to the enable signal F which indicates the nature of the required switching-on process makes it possible to transmit two information items for controlling the changeover from the energy saving mode to normal operation via a single line from the subunit 11 to the main operating unit 10.

Furthermore, the use of a bus 19 having a data line 19" and a clock line 19' allows the connection between the main operating unit 10 and the subunit 11 to be designed in an extremely simple manner in terms of circuitry, so that it is not only possible to separate the subunit 11 within the communications device from the main operating unit 10, in terms of the voltage supply, but also to provide the subunit 11 separately from the main operating unit 10 in a communications device associated with it and which operates continuously. By using the fast clock in the main operating unit 10 for reading and writing the operating state data from and to the status memory 18, the time $(t_a-t_E)$ between the end of an operating period EB and the time at which the voltage supply for the main operating unit 10 is switched off, as well as the switch-on time $T_e$, can be kept short, so that the effective time $T_a$ for which the main operating unit 10 is switched off between two successive operating periods EB is long.

What is claimed is:

1. Method for controlling a communications device which has a main operating unit and a subunit,
   in which after one operating period, operating state data for the main operating unit and for regenerating operating parameters for the next operating period of the main operating unit are stored in a status memory in the subunit and, after this, the voltage supply for the main operating unit is switched off in order to change the communications device to an energy saving method, and
   in which after the voltage supply for the main operating unit is switched on, the stored operating state data are transmitted from the status memory to the main operating unit in order to regenerate operating parameters therefrom to operate the communications device during the following operating period.

2. Method according to claim 1, characterized in that the voltage supply for the main operating unit is switched on by means of a switch-on signal from the subunit after a respectively predetermined waiting time has elapsed.

3. Method according to claim 2, characterized in that the end of the waiting time is defined in the subunit with the aid of a clocked counter whose running count is compared with a first comparison value which corresponds to the waiting time and is transmitted from the main operating unit to the subunit.

4. Method according to claim 3, characterized in that the counter is restarted after the waiting time has elapsed, in that the running count is compared with a second comparison value in order to supply the time indicator to the main operating unit, and this time indicator is used to define the start time of the following operating period.

5. Method according to claim 3, characterized in that the counter is started with the aid of a software reset command which is supplied from the main operating unit.

6. Method according to claim 1, characterized in that a time indicator is produced at a time after the voltage supply for the main operating unit has been switched on, in order to define the start time for the following operating period.

7. Method according to claim 6, characterized in that the waiting time is predetermined for the subunit as a function of the time interval between the time indicator and the start time of the following operating period by the main operating unit.

8. Method according to claim 1, characterized in that a clock signal is transmitted from the main operating unit to the subunit in order to store the operating state data for the main operating unit in the status memory in the subunit and in order to read the operating state data from the status memory.

9. Method according to claim 1, characterized in that the operating periods of the main operating unit are matched to time slots which recur at regular intervals and during which the main operating unit interchanges data with a higher-level communications device.

10. Method according to claim 1, characterized in that operating periods are started by an external event which occurs at regular intervals at least during a time period which comprises a plurality of operating periods, in particular by means of a burst which can be received by the main operating unit.

11. Method according to claim 1, characterized in that operating periods are in each case started as soon as their start time has been defined with the aid of the time indicator.

12. Method according to claim 1, characterized in that the main operating unit produces a switch-on hold signal in order to maintain its voltage supply after switching on during the operating period and to switch itself off after the end of the operating period.

13. Method for controlling a communications device which has a main operating unit and a subunit,
- in which, after one operating period, operating state data for the main operating unit are stored in a status memory in the subunit and, after this, the voltage supply for the main operating unit is switched off in order to change the communications device to an energy saving method,
- in which, after the voltage supply for the main operating unit is switched on, the stored operating state data are transmitted from the status memory to the main operating unit in order to operate the communications device during the following operating period,
- wherein a time indicator is produced at a time after the voltage supply for the main operating unit has been switched on, in order to define the start time for the following operating period, and
- wherein the time interval between the time indicator for the start time and the following operating period is measured by the main operating unit in order to optimize the duration of the effective time for which the main operating unit is switched off in a communications device whose main operating unit operates periodically.

14. Method according to claim 13, wherein the voltage supply for the main operating unit is switched on by means of a switch-on signal from the subunit after a respectively predetermined waiting time has elapsed.

15. Method for controlling a communications device which has a main operating unit and subunit,
- in which, after one operating period, operating state data for the main operating unit are stored in a status memory in the subunit and, after this, the voltage supply for the main operating unit is switched off in order to change the communications device to an energy saving method,
- in which, after the voltage supply for the main operating unit is switched on, the stored operating state data are transmitted from the status memory to the main operating unit in order to operate the communications device during the following operating period,
- wherein a time indicator is produced at a time after the voltage supply for the main operating unit has been switched on, in order to define the start time for the following operating period,
- wherein the waiting time is predetermined for the subunit as a function of the time interval between the time indicator and the start time of the following operating period by the main operating unit, and the waiting time can be redefined for each operating period.

16. Method in accordance with claim 15, wherein the voltage supply for the main operating unit is switched on by means of a switch-on signal from the subunit after a respectively predetermined waiting time has elapsed.

17. Communications device; in particular a submodule of a telecommunications unit, which interchanges data with a main module during time slots which occur at regular intervals; having a main operating unit for carrying out assigned functions, and having a subunit which has a status memory for operating state data for the main operating unit, and a timing circuit which controls the voltage supply for the main operating unit;
characterized in that the timing circuit has a clocked counter whose counter output is connected to one input of a comparison circuit, which compares the count from the counter with a comparison value which is defined by the main operating unit, in order to produce a switch-on signal for the voltage supply for the main operating unit.

18. Communications device according to claim 17 characterized in that the counter in the subunit is clocked by a clock generator which is integrated in a further electronic device with which the communications device is associated.

19. Communications device according to claim 17 characterized in that a bus having a clock signal line and a data line is provided for data interchange between the main operating unit and the subunit, so that a fast memory and read clock, respectively, can be transmitted to the subunit in order to store and read the operating state data in and from, respectively, the status memory.

20. Method for controlling a communications device which ha a main operating unit and a subunit,
- in which, after one operating period, operating state data for the main operating unit are stored in a status memory in the subunit and, after this, the voltage supply for the main operating unit is switched off in order to change the communications device to an energy saving method,
- in which, after the voltage supply for the main operating unit is switched on, the stored operating state data are transmitted from the status memory to the main operating unit in order to operate the communications device during the following operating period,
- wherein the voltage supply for the main operating unit is switched on by means of a switch-on signal from the subunit after a respectively predetermined waiting time has elapsed,
- wherein the end of the waiting time is defined in the subunit with the aid of a clocked counter whose running count is compared with a first comparison value which corresponds to the waiting time and is transmitted from the main operating unit to the subunit,
- wherein the counter is restarted after the waiting time has elapsed, in that the running count is compared with a second comparison value in order to supply the time indicator to the main operating unit, and this time indicator is used to define the start time of the following operating period.

21. Communications device; in particular a submodule of a telecommunications unit, which interchanges data with a main module during time slots which occur at regular intervals; having a main operating unit for carrying out assigned functions, and having a subunit which has a status memory for operating state data for the main operating unit, and a timing circuit which controls the voltage supply for the main operating unit,
- wherein the timing circuit has a clocked counter whose counter output is connected to one input of a comparison circuit, which compares the count from the counter with a comparison value which is defined by the main operating unit, in order to produce a switch-on signal for the voltage supply for the main operating unit.

22. Communications device according to claim 21, characterized in that one output of the comparison circuit is applied to a hold circuit which emits the switch-on signal for a time period.

23. Communications device according to claim 21, characterized in that the timing circuit has a second comparison circuit, which compares the count with a second comparison value, in order to supply to the main operating unit an output signal which provides a time indicator for defining the start time of the following operating period for the main operating unit.

24. Communications device according to claim 21, characterized in that the output signal of the second comparison circuit is supplied to the main operating unit via a gate circuit as an indicator signal, which gate circuit is controlled by an enable signal, which indicates the type of switch-on process.

* * * * *